Figure 5:
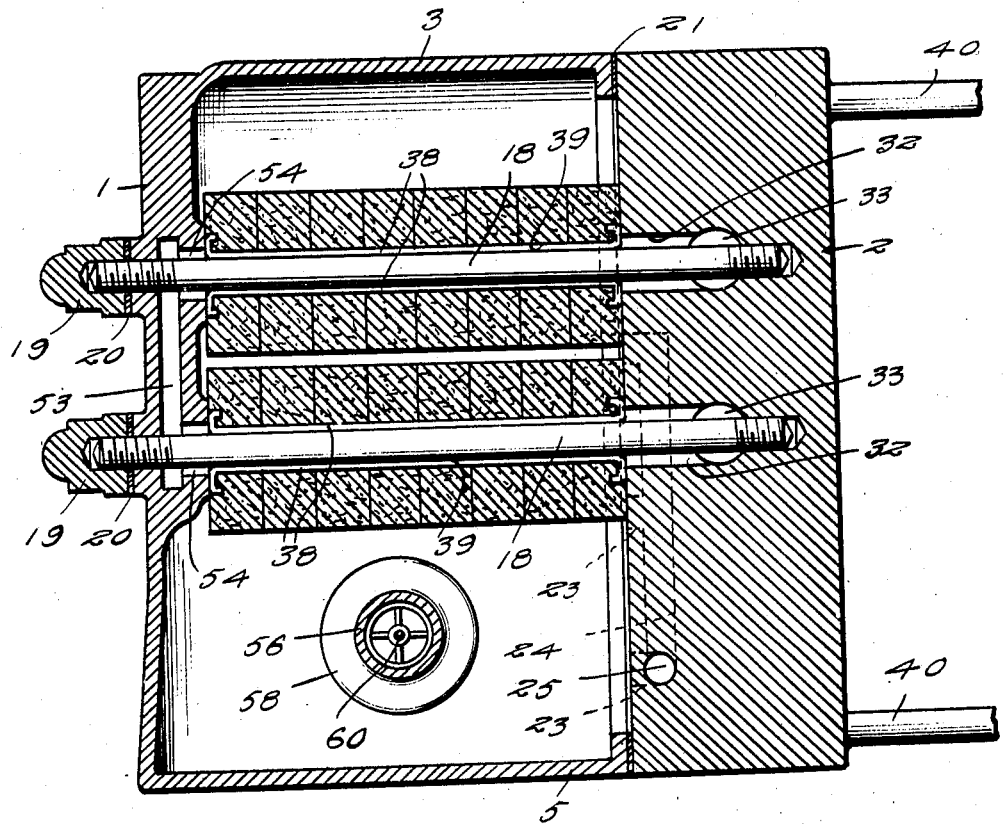

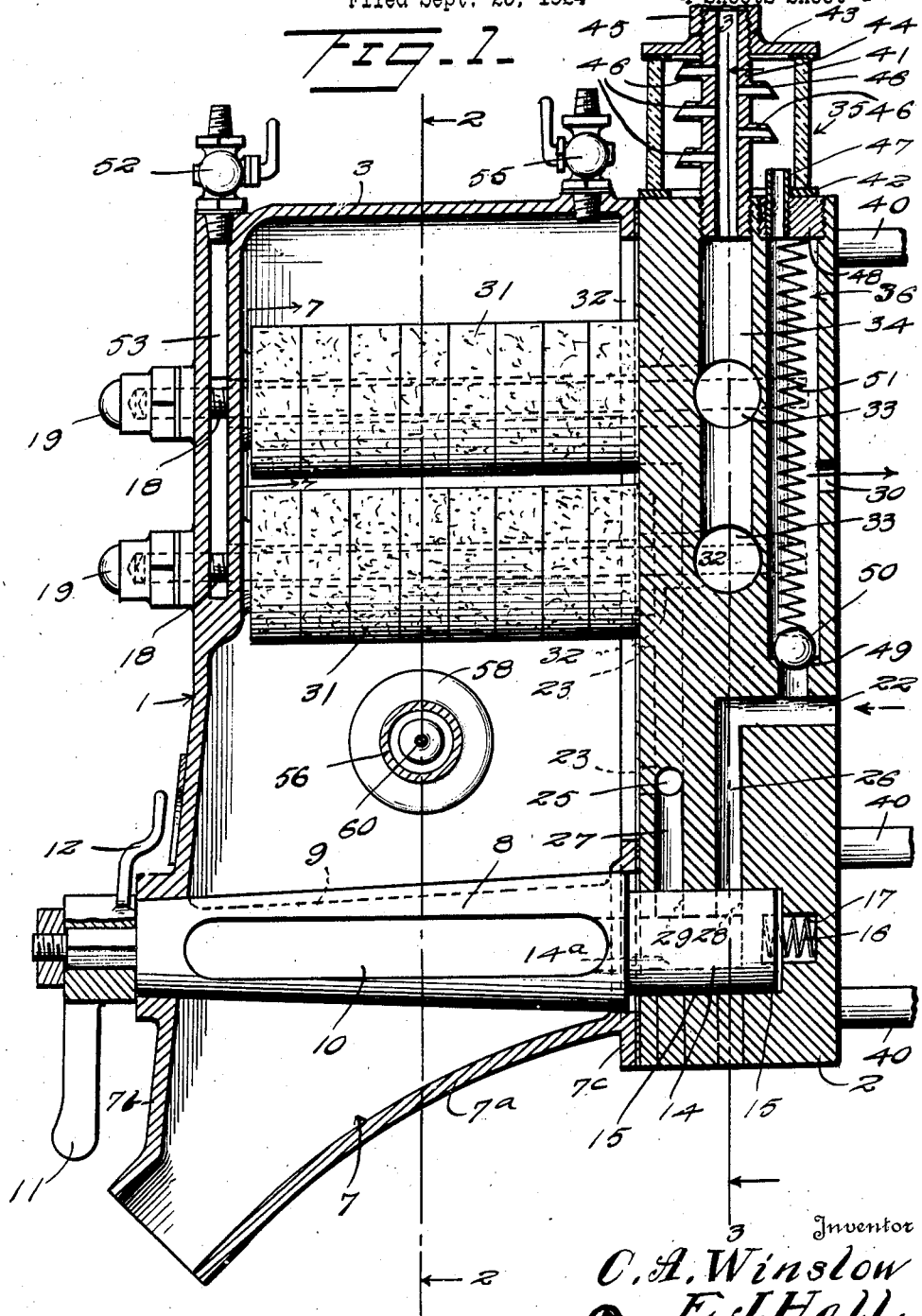

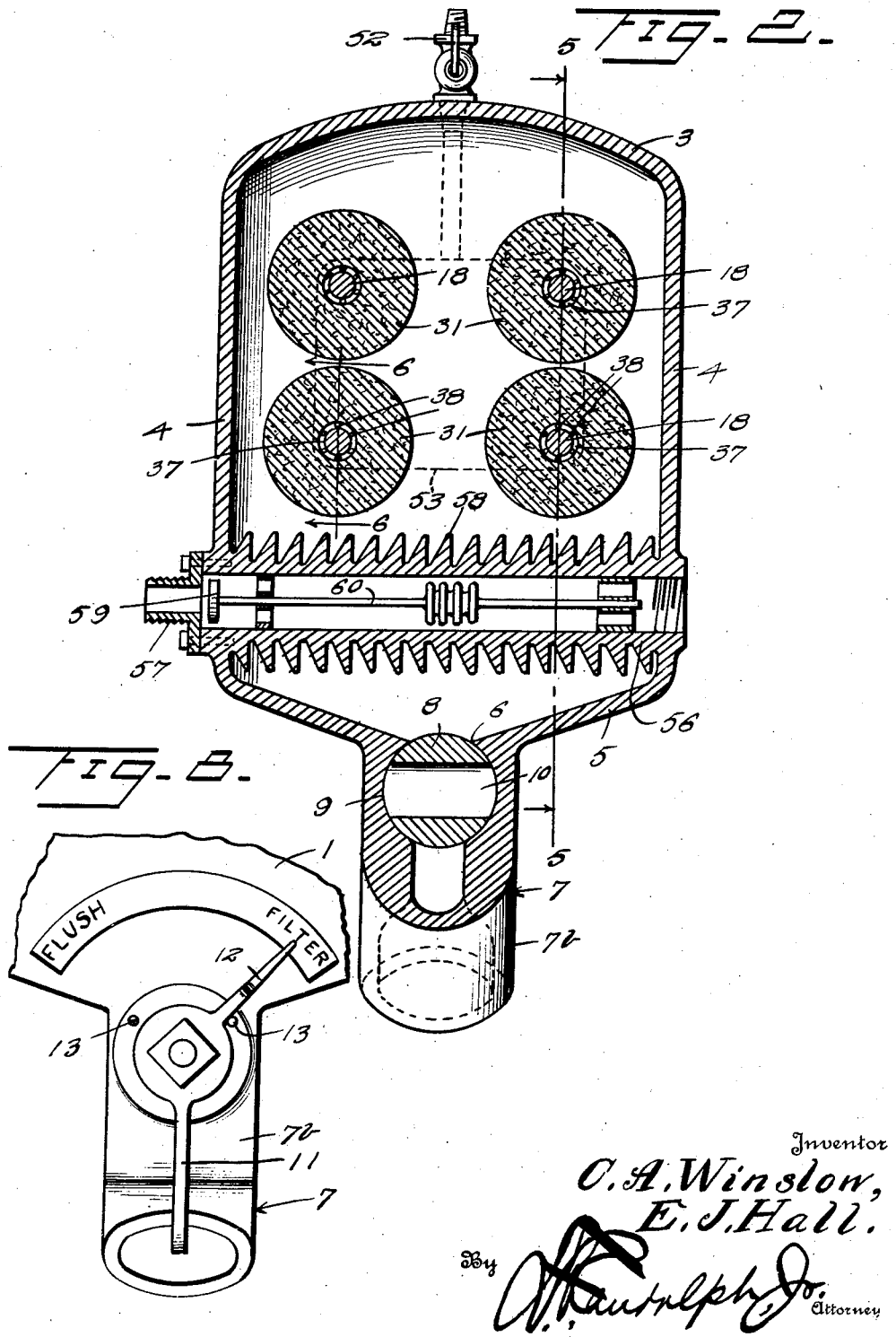

Feb. 21, 1928.
C. A. WINSLOW ET AL
1,659,902
OIL FILTER
Filed Sept. 25, 1924 4 Sheets-Sheet 3
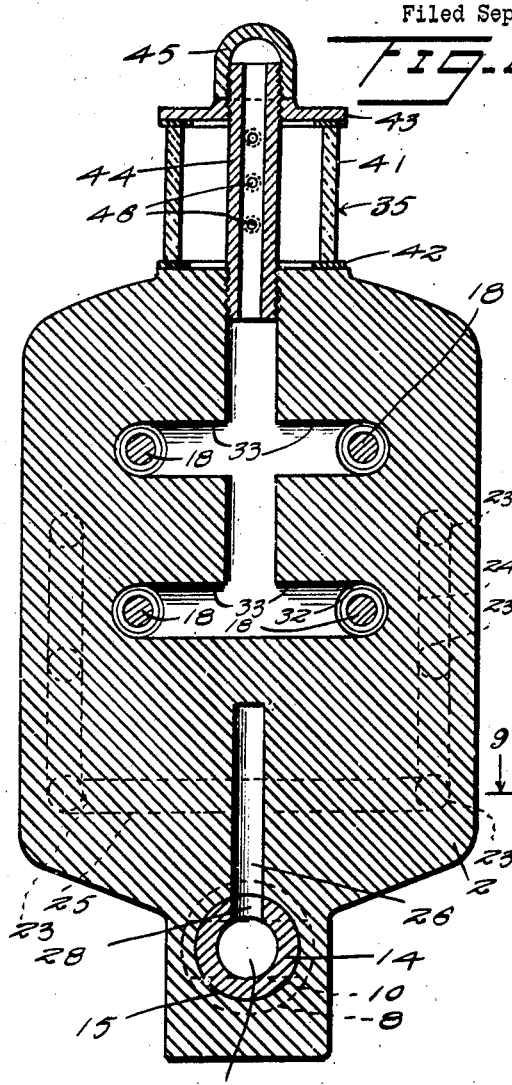
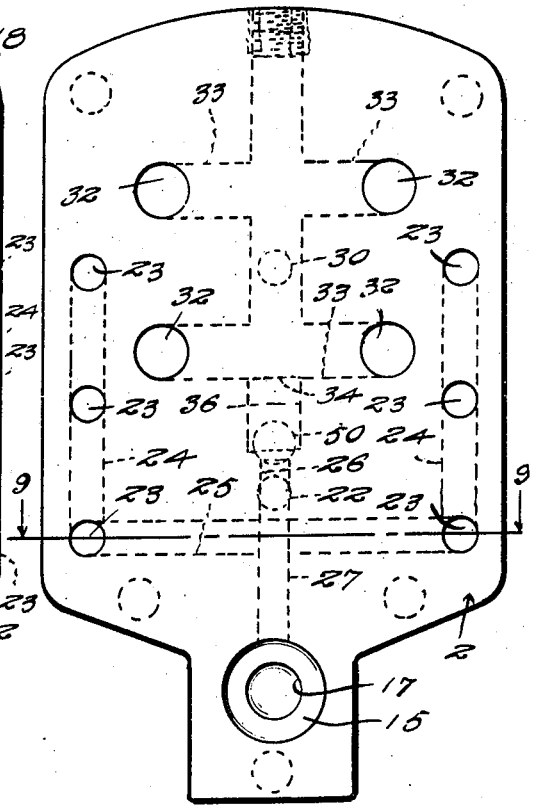
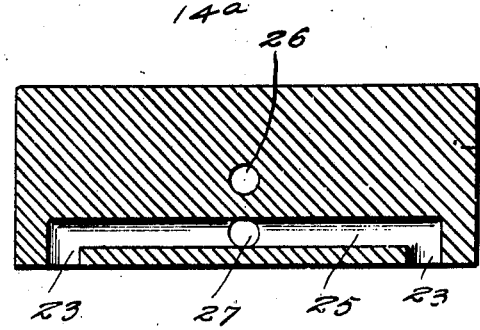
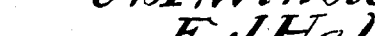
Inventor
C. A. Winslow,
E. J. Hall.
By
Attorney Feb. 21, 1928.

C. A. WINSLOW ET AL 1,659,902

OIL FILTER

Filed Sept. 25, 1924    4 Sheets-Sheet 4

Inventor
C. A. Winslow,
E. J. Hall.
By
Attorney

Patented Feb. 21, 1928.

1,659,902

UNITED STATES PATENT OFFICE.

CHARLES A. WINSLOW, OF VALLEJO, AND ELBERT J. HALL, OF BERKELEY, CALIFORNIA.

OIL FILTER.

Application filed September 25, 1924. Serial No. 739,958.

This invention relates to filters and has for one of its objects the provision of a novel and simple device of this character especially adapted for use in connection with hydrocarbon engines.

A further object of the invention is the provision of a filter which will, from the initial or test operation of the engine until the filter becomes inoperative from any cause, such as the clogging of its filtering element, positively prevent the lubricating oil carrying foreign matter to the bearings.

A further object of the invention is the provision of a filter which will also refine the lubricating oil so as to effect a constant improvement in its lubricating qualities, and to attain this end there is employed in conjunction with the filter a heater which will raise the temperature of the oil to such degree as to permit the filter to remove those constituents of the oil that lower its lubricating efficiency.

A further object of the invention is the provision of a filter which will under any and all conditions of its filtering element supply the proper amount of oil to the bearings of the engine.

A further object of the invention is the provision of a filter which shall include means by which it may be rendered inoperative without interfering with the free circulation of the oil to the bearings of the engine.

A further object of the invention is the provision of a filter which shall include means adapted to keep the operator constantly informed regarding the degree of efficiency of its filtering element.

A further object of the invention is the provision of a filter adapted to permit its filtering element to be readily cleaned by the lubricating oil.

A further object of the invention is the provision of a filter adapted to permit its filtering element to be readily cleaned by drawing or forcing a gas or fluid through the filtering element.

A further object of the invention is the provision of a filter which may be drained at the same time that its filtering element is being cleaned.

A further object of the invention is the provision of a filter which shall include a draining valve adapted when in opened position to reverse the direction of the flow of liquid within the filter to effect the cleaning of its filtering element.

A further object of the invention is the provision of a filter of the character stated which may be readily secured in applied position.

A still further object of the invention is the provision of a filter which shall include means adapted to shunt the liquid by its filtering element should it become clogged whereby to insure the supply of the proper amount of lubricant to the bearings of the engine.

Figure 6:
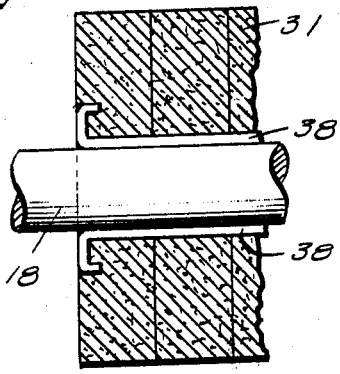
Figure 7:
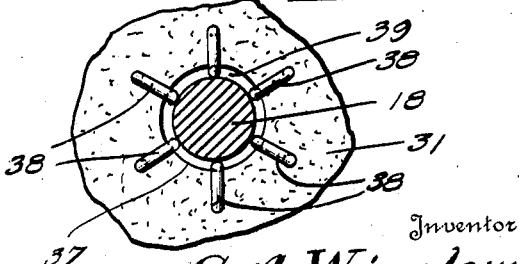

With the above and other objects in view, the invention consists in the construction, combination, and arrangement of parts hereinafter fully described and claimed, and illustrated in the accompanying drawings, wherein:

Figure 1 is a sectional view taken on a plane extending vertically through a filter constructed in accordance with our invention, Figure 2 is a sectional view taken on the vertical plane indicated by the line 2—2 of Figure 1, looking in the direction indicated by the arrows, Figure 3 is a sectional view taken on the vertical plane indicated by the line 3—3 of Figure 1, looking in the direction indicated by the arrows, Figure 4 is a detail view in front elevation of the rear wall of the filter casing, Figure 5 is a sectional view taken on the vertical plane indicated by the line 5—5 of Figure 2, looking in the direction indicated by the arrows, Figure 6 is a sectional view of a fragmentary portion of one of the units of the filtering element of the filter, the section being taken on the vertical plane indicated by the line 6—6 of Figure 2, looking in the direction indicated by the arrows, Figure 7 is a sectional view taken on the plane indicated by the line 7—7 of Figure 1, looking in the direction indicated by the arrows, and Figure 8 is a detail view in front elevation of the drain spout and a fragmentary portion of the front wall of the casing of the filter, illustrating the means by which the drain valve may be turned into opened or closed position and the means through the medium of which the position of the drain valve may be determined.

Figure 9 shows a sectional view taken on the line 9—9 of Figure 4.

Corresponding and like parts are referred to in the following description and designated in the several views of the drawings by similar reference characters.

The filter comprises a casing which includes a front wall 1, a rear wall 2, a top wall 3, side walls 4, and a bottom wall 5. As shown in Figure 2, the bottom wall 5 inclines downwardly and inwardly to and in the direction of a drain opening 6. The drain slot 6 is arranged centrally of the casing and extends from the front wall 1 to the rear wall 2 thereof. A drain spout 7 which communicates with the casing through the slot 6 is connected to the bottom wall 5 and it is of narrow formation. The bottom wall 7ª of the spout 7 curves downwardly and forwardly. The front wall 7ᵇ of the spout 7 and the lower portion of the front wall 1 of the casing are in alinement and incline downwardly and forwardly. A drain valve 8 is rotatably mounted in a seat 9 formed in the spout 7 and the valve and seat are similarly tapered. The valve 8 is provided with an opening 10 which extends longitudinally thereof and which when in registration with the slot 6 permits the contents of the casing to drain out through the spout 7. When the valve 8 is turned to move the opening 10 out of registration with the slot 6, the bottom of the casing is fully closed. The front end of the valve 8 is provided with a handle 11 by means of which it may be turned into opened or closed possition, and the handle is provided with a pointer 12 which points to the word "Flush" when the valve is in opened position and to the word "Filter" when the valve is in closed position; these words, as shown in Figure 8, appearing upon the outer side of the front wall 1 of the casing. To limit the opening and closing movements of the valve 8 so as to insure the movement of the valve to fully opened position when it is desired to drain the casing and to insure the movement of the valve into fully closed position when it is desired to filter the lubricating oil, the front wall 7ᵇ of the spout 7 is provided with stops 13 arranged on opposite sides of the pointer 12. At its inner end the valve 8 is provided with a cylindrical extension 14 which is located in a similar socket 15 formed in the wall 2 of the casing. An expansion spring 16 bears against the end of the extension 14 to maintain the valve 8 in firm contact with the seat 9. The spring 16 is located in a small socket 17 formed in the bottom wall of the socket 15. The extension 14 is provided with a recess 14ª which communicates with the opening 10 in the valve 8.

The wall 2 of the casing is of considerable thickness, and it is removably secured in place by studs 18 which have threaded connection therewith and which extend forwardly beyond the front wall 1 of the casing. The forward ends of the studs 18 are threaded, they pass freely through the front wall 1, and have mounted thereon nuts 19 which retain the wall 2 in place. To establish leak-proof connections between the studs 18 and the front wall 1, gaskets 20 are employed and to establish a leak-proof connection between the wall 2 and the remainder of the casing and the spout 7, a gasket 21 is employed.

The oil to be filtered is delivered to the casing through an intake port 22 which opens out through the rear side of the rear wall 2, and through a plurality of distributing and velocity reducing ports 23 which open out through the inner side of the wall 2. The ports 23 are preferably arranged in series of three each, and the ports of each series are relatively spaced. Communication between the ports of each series is established by a passage 24, and communication between the respective series of ports is established by a passage 25. Communication between the intake port 22 and the passage 25 is established by a passage 26, which communicates at one end with the port 22 and at the other with the recess 14ª in the valve extension 14, and by a passage 27 which communicates at one end with the recess 14ª and at the other with the passage 25. The extension 14 is provided with ports 28 and 29 to respectively establish communication between the passages 26 and 27 and the recess 14ª, and these ports 28 and 29 are in communication with the passages 26 and 27 only when the valve 8 is in closed position. As the oil is discharged into the casing through the ports 23 the capacity of which is greater than that of the intake port 22, the oil is delivered into the casing at a velocity considerably lower than that at which it is delivered to the intake port 22, with the result that the oil in the casing will not be stirred up, and due thereto the sediment falling to the bottom of the casing will not be disturbed. As the recess 14ª is in communication with the passages 26 and 27 and as it is in communication with the opening 10, the opening 10 will form a sediment chamber which will be discharged promptly upon the turning of the valve into opened position.

The filter is provided with a discharge port 30. After the oil passes through the filtering elements 31 it passes through ports 32 and passages 33 to a chamber 34. Communication between the chamber 34 and the discharge port 30 is established by a sight feed apparatus 35, which communicates with the chamber 34, and by a passage 36 which also communicates with the sight feed apparatus and the discharge port 30.

The filtering elements may be made of any suitable material and they communicate at their centers with the ports 32. The filtering elements 31 shown in the drawings, are preferably made of disks of felt, and they are mounted upon the studs 18 in close contact with each other and with the front walls 1 and rear wall 2. The felt disks are provided with openings 37 which are larger in diameter than the studs 18. The felt disks of each filtering element 31 are connected together in order to facilitate their application or removal by rods 38 which pass through the openings 37 of the filtering elements and which have their ends turned into the terminals of the filtering elements. The rods 38 provide, as seen in Figure 7, passages 39 between the filtering elements and the studs 18, and these passages communicate with the ports 32 in order that the oil passing through the filtering elements will be delivered to the discharge port 30.

In practice, the filter will be installed in the lubricating system of a hydro-carbon engine in such a manner that the lubricating oil will be either drawn or forced through the filtering elements and in either installation the oil will be freed of all foreign matter before it reaches the bearings. When it is desired to so install the filter that the lubricating oil will be forced through the same, the intake port 22 will be connected to the discharge side of the oil pump of the system and the discharge port 30 will be connected to the oil distributing portion of the system. When, however, it is desired to so install the filter so that the lubricating oil will be drawn through the same, the discharge port 30 will be connected to the intake side of the oil pump, and a pipe having its intake end dipping into the oil sump of the engine will be connected to the intake port 22. As the filter retains the foreign matter separated from the lubricating oil, it should be apparent that if the filter is installed before the initial or test operation of the engine all possibility of any injury to the moving parts of the engine will be avoided. The lubricating oil is positively prevented from carrying foreign matter to the bearings of the engine until such time as the filter becomes inoperative from any cause, such as the clogging of the filtering elements 31 as the result of neglect. The rear wall 2 of the casing is provided with studs 40 through the medium of which the filter may be secured in applied position, and it is preferably secured to the side of the engine block or crank case. If desired, the wall 2 may be welded to the side of the engine block or crank case, or it may form an integral portion of the engine block or crank case. When the wall 2 is formed integrally with the engine block or crank case, the other parts of the filter are secured thereto by the studs 18.

The sight feed apparatus 35 provides means through the medium of which the operator may be constantly kept informed regarding the degree of filtering efficiency of the elements 31. The sight feed apparatus 35 comprises a cylindrical transparent body 41 which is mounted upon the upper edge of the wall 2 about the discharge end of the chamber 34 and the intake end of the passage 36. A gasket 42 establishes a leak-proof connection between the cylinder 41 and the wall 2. The head 43 of the sight feed apparatus 35 is secured in place by a tube 44 and a cap nut 45. The tube 44 communicates with the chamber 34, and it is provided with relatively spaced discharge nozzles 46. When the filter is functioning at maximum capacity, the filtered oil will flow out of all of the nozzles 46 into the sight feed apparatus 35, from this apparatus through the passage 36 to the discharge port 30 and thence to the bearings of the engine. When the filter is not functioning at maximum capacity, as for instance when the filtering elements 31 are more or less clogged, the number of nozzles 44 through which the filtered oil will flow will be reduced. In other words, the number of nozzles 46 through which the filtered oil will flow depends upon the rate of flow of the oil through the filtering elements 31, and due thereto the degree of cleanliness of the elements 31 may be determined from the sight feed apparatus 35. Communication between the sight feed apparatus 35 and the passage 36 is established by a tube 47 which is carried by a plug 48 closing the upper end of this passage and which extends into the sight feed apparatus 35 for a short distance above the bottom wall thereof. That portion of the tube 47 which extends into the sight feed apparatus 35 retains a portion of the filtered oil within the apparatus in order that the operator may determine from the color of the oil passing to the bearings of the engine the degree of filtering efficiency of the elements 31.

The passage 36 extends below the discharge port 30 to and communicates with the intake port 22. Adjacent the intake port 22 the passage 36 is provided with a seat 49 upon which rests a ball valve 50. A light spring 51, which is located in the passage 36 between the plug 48 and the ball 50, serves to normally retain the ball upon its seat 49 so as to prevent under normal conditions the passage of oil from the intake 22 to the discharge port 30 by way of the passage 36.

Should the filter become inoperative from any cause, such for instance as the clogging of the filtering elements to such an extent as to prevent the passage therethrough of sufficient oil to properly lubricate the bearings of the engine, the pressure of the oil at the intake port 22 will be increased sufficiently to unseat the valve 50. When this occurs the oil will flow from the intake port 22 to the bearings of the engine by way of the passage 36 and the discharge port 30. From the structure just described, it will be apparent that the lubricator is provided with a valve controlled by-pass which will insure the proper supply of oil to the bearings of the engine whenever the filtering elements 31 become clogged to such an extent as to prevent the passage therethrough of the desired or required quantity of oil.

When it is desired to clean the filtering elements 31 by the oil, it is only necessary to turn the drain valve 8 into opened position and operate the engine. The opening of the drain valve 8 closes the lower ends of the passages 26 and 27, with the result that the oil will flow from the intake port 22 into the passage 36, from the passage 36 into the sight feed apparatus 35, from the sight feed apparatus 35 into the chamber 34, from the chamber 34 into the passages 33, and from the passages 33 through the openings 32 into the centers of the filtering elements 31. The oil passes outwardly through the filtering elements 31 and removes all foreign matter therefrom. After passing through the filtering elements 31 the oil passes out through the drain spout 7. After the filtering elements 31 have been cleaned, the valve 8 is closed with the result that the filter is again in condition for removing all foreign matter from the lubricating oil. During the cleaning of the filter, the resistance of the filtering elements to the flow of oil therethrough is less than the pressure at the discharge port 30 due to resistance of the bearings to the flow of oil therethrough, with the result that sufficient oil will pass through the filtering elements 31 to clean the same. As the pressure at the discharge port 30 due to the resistance offered to the flow of oil through the bearings of the engine, is greater than the resistance of the filtering elements 31 offered to force the oil from the interior to the exterior thereof, the fact that the engine is in operation will not prevent the passage of sufficient oil through the filtering elements to effect a thorough cleaning thereof. Means is provided to permit the filtering elements to be cleaned by air, and this means permits air to be either forced or drawn through the filtering elements 31. This means comprises a stop cock 52 which communicates with the interior of the filtering elements 31 through a passage 53 and openings 54, as clearly shown in Figures 1 and 5. This means also includes a stop cock 55 which communicates with the interior of the casing. When it is desired to clean the filtering elements 31 by forcing air through them, the stop cocks 52 and 55 are opened, and a hose extending from any suitable source of air under pressure is connected to the stop cock 52, and when it is desired to clean the filtering elements 31 by drawing air therethrough, the stop cocks 52 and 55 are opened and a pipe from a suction pump or the intake manifold of the engine is connected to the stop cock 55. If desired, the exhaust or cylinder pressure of the engine may be utilized for the purpose of cleaning the filtering elements 31, and to accomplish this it is only necessary to establish a connection between the source of pressure and the stop sock 52.

To permit the filter to refine the lubricating oil so as to effect a constant improvement in its lubricating qualities, means is provided by which the oil may be heated before it passes through the filtering elements 31 (by means of the exhaust of the engine or any other suitable heating medium.) The means preferably comprises, as best shown in Figure 2, a tube 56 extending through the filter. This tube is open at both ends, and at one end is provided with a coupling 57 to permit the exhaust of the engine or other heat containing medium to be directed through the tube 56 by means of a pipe. The tube 56 is preferably provided with a plurality of heat radiating fins 58. In order to prevent the oil from being heated above a predetermined degree, a valve 59 which is under the control of a thermostat 60 is arranged at the intake end of the tube 56 and when in closed position it seats against the inner side of and closes the coupling 57. The thermostat may be of any suitable appropriate construction.

From the foregoing description taken in connection with the accompanying drawings, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative and that such changes may be made as are necessary or desired as are within the scope of the invention as claimed. The filter is also adapted to be used for removing foreign matter from the fuel and cooling fluid of a hydro-carbon engine before they are delivered respectively to the carbureter or fuel nozzle and the cooling jacket of the engine.

Having thus described the invention, what is claimed is:—

A filter comprising a casing having an inlet and an outlet connection, a filter element disposed in the casing between said inlet and outlet connections, said casing having a drain opening in its bottom and a valve to control said drain opening, said valve serving also to control the inlet connection to the casing, whereby when the drain is opened the inlet to the casing will be closed, a connection between the inlet and outlet connections forming a by-pass around the filter, and a spring-pressed valve controlling said by-pass communication, said valve acting when a predetermined pressure exists therein due to closing of the valve which controls the inlet to the filter, or to clogging of the filter, to automatically open and by-pass the oil around said filter.

In testimony whereof we affix our signatures.

CHARLES A. WINSLOW.
ELBERT J. HALL.